United States Patent
Ueda et al.

(10) Patent No.: US 10,775,193 B2
(45) Date of Patent: Sep. 15, 2020

(54) MAP DISPLAY SYSTEM AND MAP DISPLAY PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Kazuya Ueda, Tsushima (JP); Kazunori Watanabe, Okazaki (JP)

(73) Assignees: AISIN AW CO., LTD., Anjo-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 46 days.

(21) Appl. No.: 16/095,429

(22) PCT Filed: May 23, 2017

(86) PCT No.: PCT/JP2017/019170
§ 371 (c)(1),
(2) Date: Oct. 22, 2018

(87) PCT Pub. No.: WO2017/208900
PCT Pub. Date: Dec. 7, 2017

(65) Prior Publication Data
US 2019/0137297 A1    May 9, 2019

(30) Foreign Application Priority Data

May 30, 2016  (JP) .................................. 2016-106971

(51) Int. Cl.
*G01C 21/36*  (2006.01)
*G06F 3/0485*  (2013.01)
(Continued)

(52) U.S. Cl.
CPC ......... *G01C 21/3697* (2013.01); *G01C 21/36* (2013.01); *G01C 21/367* (2013.01);
(Continued)

(58) Field of Classification Search
CPC .. G01C 21/3697; G01C 21/36; G01C 21/367; G06F 3/0481; G06F 3/04817; G06F 3/0485; G09B 29/00; G09B 29/10
(Continued)

(56) References Cited

FOREIGN PATENT DOCUMENTS

| JP | 2003-004463 A | 1/2003 |
| JP | 2006-155603 A | 6/2006 |

(Continued)

OTHER PUBLICATIONS

International Search Report of PCT/JP2017/019170 dated Jul. 18, 2017 [PCT/ISA/210].

*Primary Examiner* — Brian P Sweeney
(74) *Attorney, Agent, or Firm* — Sughrue Mion, PLLC

(57) ABSTRACT

There is provided a technique for reducing the frequency of a user feeling annoyed. A map display system includes: a map display part that displays a map on a display; an icon display control part that selects a type of icons to be displayed from among a plurality of types based on a number of the icons displayed on the map, and displays ground objects by the icons of the selected type on the map; and an icon selection control part that allows or prohibits a change in the type of icons selected by the icon display control part, and prohibits, when scrolling of the map is performed, a change in the type of icons before and after the scrolling.

7 Claims, 3 Drawing Sheets

(51) Int. Cl.
*G09B 29/10* (2006.01)
*G06F 3/0481* (2013.01)
*G09B 29/00* (2006.01)

(52) U.S. Cl.
CPC .......... *G06F 3/0481* (2013.01); *G06F 3/0485* (2013.01); *G06F 3/04817* (2013.01); *G09B 29/00* (2013.01); *G09B 29/10* (2013.01)

(58) Field of Classification Search
USPC ........................................................ 701/431
See application file for complete search history.

(56) References Cited

FOREIGN PATENT DOCUMENTS

| | | |
|---|---|---|
| JP | 2010-060712 A | 3/2010 |
| JP | 2011-180078 A | 9/2011 |

MAP DISPLAY SYSTEM AND MAP DISPLAY PROGRAM

CROSS REFERENCE TO RELATED APPLICATIONS

This application is a National Stage of International Application No. PCT/JP2017/019170, filed May 23, 2017, claiming priority based on Japanese Patent Application No. 2016-106971, filed May 30, 2016.

TECHNICAL FIELD

Aspects of the application relate to a map display system and a map display program.

BACKGROUND ART

Conventionally, there is known a system that can switch the type of icons displayed on a map. For example, Patent Literature 1 discloses an apparatus in which, when landmarks are present in a predetermined region, normal landmarks are obtained and the landmarks are displayed at normal size, and when landmarks are present outside the predetermined region, simple landmarks are obtained and simple display is performed.

CITATION LIST

Patent Literature

Patent Literature 1: JP 2003-4463 A

SUMMARY OF EMBODIMENTS

Technical Problems

In the above-described conventional art, the type of icons is frequently switched, and thus, a user may have felt annoyed. For example, in the above-described conventional art, every time landmarks present in the predetermined region are changed by a change in current location, switching between normal landmarks and simple landmarks is performed.

Aspects of the present application are made in view of the above-described problem and provides a technique capable of reducing the frequency of the user feeling annoyed.

Solutions to Problems

To obtain the above-described technique, a map display system includes: a map display part that displays a map on a display; an icon display control part that selects a type of icons to be displayed from among a plurality of types based on a number of the icons displayed on the map, and displays ground objects by the icons of the selected type on the map; and an icon selection control part that allows or prohibits a change in the type of icons selected by the icon display control part, and prohibits, when scrolling of the map is performed, a change in the type of icons before and after the scrolling.

In addition, to obtain the above-described technique, a map display program causes a computer to function as: a map display part that displays a map on a display; an icon display control part that selects a type of icons to be displayed from among a plurality of types based on a number of the icons displayed on the map, and displays ground objects by the icons of the selected type on the map; and an icon selection control part that allows or prohibits a change in the type of icons selected by the icon display control part, and prohibits, when scrolling of the map is performed, a change in the type of icons before and after the scrolling.

As described above, in the map display system and program, a type of icons to be displayed is selected from among a plurality of types based on the number of the icons displayed on a map, but a change in the type of the icons before and after scrolling of the map is prohibited. Namely, in a configuration in which a type of icons to be displayed is selected from among a plurality of types based on the number of the icons displayed on the map, the type of icons can change by a change in map display range, etc. However, if a change in the type of icons is allowed when the number of icons displayed on the map is changed by scrolling of the map resulting from a change in current location, etc., then the type of icons frequently changes along with scrolling of the map. In this case, a user feels annoyed. However, if a change in the type of icons before and after scrolling is prohibited by the icon selection control part, then the type of icons does not change along with scrolling of the map. Therefore, the frequency of the user feeling annoyed can be reduced.

DESCRIPTION OF EMBODIMENTS

Here, the embodiments will be described in the following order:
(1) Configuration of a map display system;
(2) Icon display process; and
(3) Other embodiments.

(1) Configuration of a Map Display System

Figure 1:
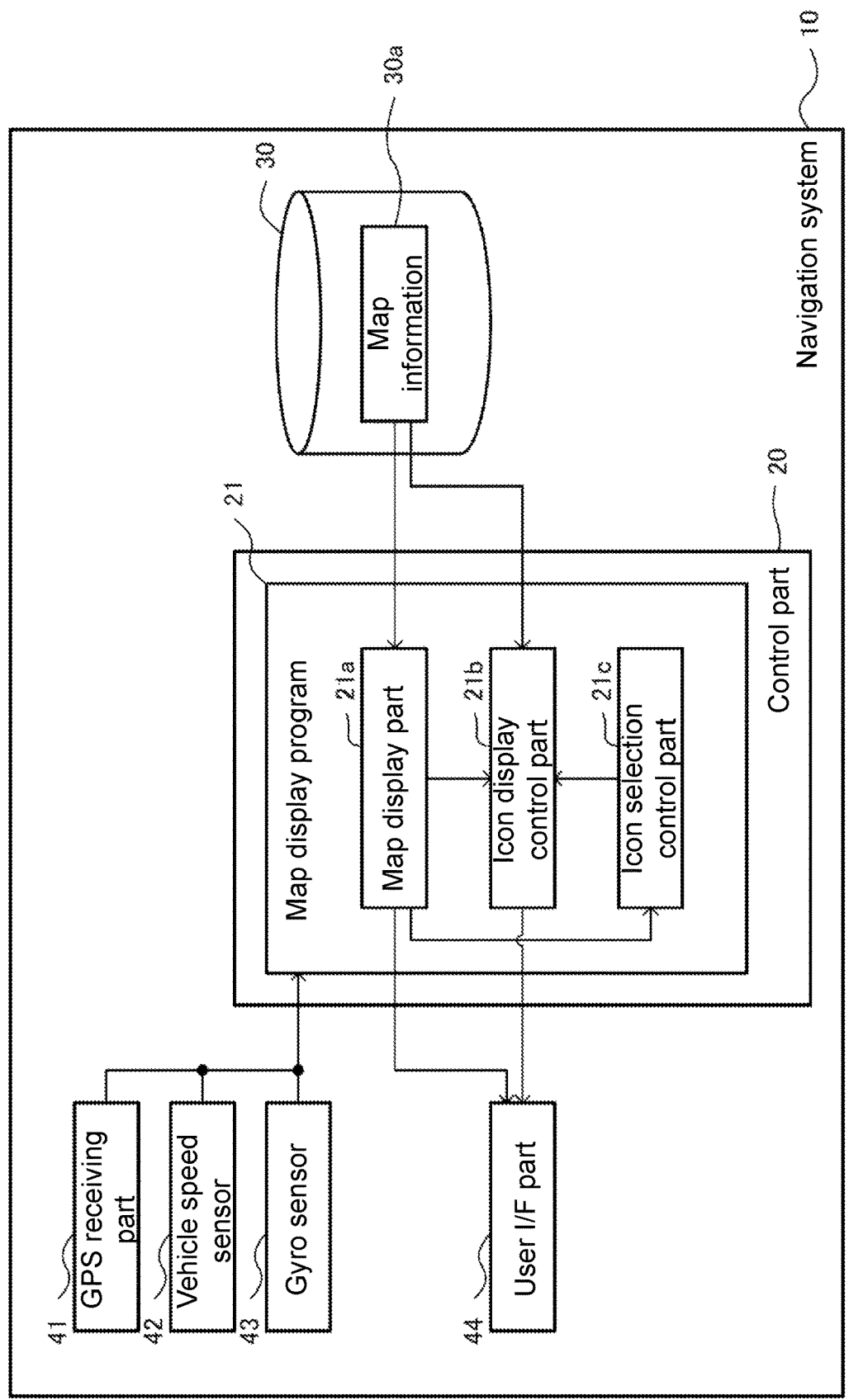
FIG. 1 is a block diagram showing a configuration of a map display system.

FIG. 1 is a block diagram showing a configuration of a navigation system 10 functioning as a map display system according to one embodiment. In the present embodiment, the navigation system 10 is used in a vehicle, and includes a control part 20 including a CPU, a RAM, a ROM, etc. The control part 20 can execute a navigation program recorded in the ROM or a recording medium 30. In the present embodiment, a map display program 21 forming a part of the navigation program can be executed.

The recording medium 30 has map information 30*a* recorded therein in advance. The map information 30*a* includes shape interpolation point data representing, for example, the locations of nodes corresponding to endpoints of a road section and the locations of shape interpolation points for identifying the shape of a road between the nodes; link data representing a link between the nodes; facility data representing the locations and attributes of facilities (ground objects); and the like. The attributes of facilities can be defined in various manners. In the present embodiment, names, the types of facilities, etc., are defined as attributes and associated. The types of facilities are, for example, parking lots and convenience stores, and may be broken down into smaller units (e.g., convenience stores are broken down into chains).

In addition, the map information 30a includes image data of icons representing the locations of facilities on a map. Namely, in the present embodiment, by displaying icons at the locations of respective facilities on the map, the presence of the facilities on the map is shown. Hence, in the present embodiment, the shapes, colors, and sizes of icons are predefined for each type of facility, and image data for displaying the icons is generated and recorded in the map information 30a. Note that, in the present embodiment, two types of icons are predefined for facilities of the same type. Namely, a normal icon used for normal display and a simple icon used when the number of icons simultaneously displayed on a display is greater than or equal to a threshold value are predefined, and recorded in the map information 30a so as to be associated with facilities of the same type.

The navigation system 10 includes a GPS receiving part 41, a vehicle speed sensor 42, a gyro sensor 43, and a user I/F part 44. The user I/F part 44 is an interface part for accepting, as input, user's instructions or providing various types of information to a user, and includes a touch panel type display and an output part for output sound such as a speaker, which are not shown.

The GPS receiving part 41 receives radio waves from GPS satellites, and outputs a signal for calculating a current vehicle location, through an interface which is not shown. The vehicle speed sensor 42 outputs a signal corresponding to the rotational speed of wheels provided on the vehicle. The control part 20 obtains this signal through an interface which is not shown, to obtain vehicle speed. The gyro sensor 43 detects angular acceleration for a turn in a horizontal plane of the vehicle, and outputs a signal corresponding to vehicle's orientation. The control part 20 obtains this signal to obtain a vehicle's traveling direction. The control part 20 obtains a current vehicle location by identifying a vehicle's traveling path based on the output signals from the vehicle speed sensor 42, the gyro sensor 43, and the like. The output signal from the GPS receiving part 41 is used, for example, to correct the current vehicle location identified by the vehicle speed sensor 42, the gyro sensor 43, and the like.

The control part 20 can search for a route for the vehicle to reach a destination after departing a current location, by a process of the navigation program. In addition, the control part 20 can provide guidance for guiding the vehicle including the navigation system 10 along the route, by a process of the navigation program. Furthermore, the control part 20 can display a map including icons on the display of the user I/F part 44 to provide the guidance, etc., by a process of the map display program 21.

To perform the map display, the map display program 21 includes a map display part 21a, an icon display control part 21b, and an icon selection control part 21c. The map display part 21a allows the control part 20 to implement a function of displaying a map on the display of the user I/F part 44. Namely, the control part 20 identifies a current vehicle location based on output signals from the GPS receiving part 41, the vehicle speed sensor 42, and the gyro sensor 43. In addition, the control part 20 identifies a scale at which display is to be performed from a plurality of scales at which a map can be displayed. A map scale may be predetermined or may be determined by a user's instruction on the user I/F part 44.

Furthermore, the control part 20 generates image data in which a map having the current vehicle location at a preset location on the display of the user I/F part 44 is rendered at the scale at which display is to be performed, by referring to the map information 30a. At this time, the control part 20 renders a map without including facilities on the map. When the image data is generated, the control part 20 outputs the image data and a control signal to the user I/F part 44 to display the map. The displayed map serves as a target for being superimposed with icons. Since this process is performed every certain period (e.g., 100 ms), the map can be scrolled along with a change in current vehicle location. Needless to say, a map rendering method is an example and, for example, a configuration may be employed in which a map in a range that exceeds a display range on the display is rendered and the display range is changed along with the movement of the current location, etc.

The icon display control part 21b is a program module that allows the control part 20 to implement a function of selecting a type of icons to be displayed from among a plurality of types, and displaying ground objects by icons of the selected type on the map. In the present embodiment, the control part 20 selects a type of icons to be displayed, based on the number of the icons displayed on the map.

To select a type of icons to be displayed, first, the control part 20 identifies a type of facilities to be displayed. In the present embodiment, a type of facilities to be displayed is predetermined by various techniques. Various techniques can be adopted for determining facilities to be displayed. For example, a configuration can be adopted in which, for example, a user provides an instruction using the user I/F part 44 and the control part 20 selects a type of facilities to be displayed, according to the instruction.

The control part 20 identifies a range of the map displayed on the display by a process of the map display part 21a, and extracts facilities of the type to be displayed from among facilities present in the range of the map, by referring to the map information 30a. Furthermore, the control part 20 identifies the number of the extracted facilities. Namely, the number of icons to be simultaneously displayed on the display is identified. Then, when the number of icons is less than a threshold value, the control part 20 determines the type of the icons to be displayed to be normal icons.

When the number of icons is greater than or equal to the threshold value, the control part 20 determines the type of the icons to be displayed to be simple icons. When the type of the icons to be displayed is determined, the control part 20 records information indicating the type of the icons to be displayed in a RAM or the like which is not shown. Then, the control part 20 identifies the locations of the facilities to be displayed by referring to the map information 30a, and outputs a control signal to the user I/F part 44 to display icons of the type to be displayed at the locations of the respective facilities on the map. The display of icons (superimposition on the map) is performed every certain period (e.g., 100 ms). In the present embodiment, since the certain period is very short, essentially, every time an arbitrary event (scrolling of the map, a change in scale, a change in the type of facilities to be displayed, etc.) takes place, the display of icons is also renewed.

The icon selection control part 21c is a program module that allows the control part 20 to implement a function of allowing or prohibiting a change in the type of icons selected by the icon display control part 21b. Namely, by the function of the icon display control part 21b, the control part 20 selects a type of icons to be displayed based on the number of the icons displayed on the map; on the other hand, by the function of the icon selection control part 21c, the control part 20 validates the selection (a state in which a change is allowed) or invalidates the selection (a state in which a change is prohibited).

In the present embodiment, the control part 20 normally allows a change in the type of icons. However, when scrolling of the map is performed, the control part 20 prohibits a change in the type of icons before and after the scrolling. Namely, when scrolling of the map is performed by the function of the map display part 21*a*, the control part 20 prohibits a change in the type of icons before and after the scrolling. Specifically, when scrolling of the map is performed, since the range of the map displayed on the display of the user I/F part 44 changes, the number of icons (the number of facilities) to be displayed can change before and after the scrolling.

Therefore, when the number of icons is greater than or equal to the threshold value at one of times before and after scrolling, and is less than the threshold value at the other time, by the function of the icon display control part 21*b*, different types of icons are selected before and after the scrolling. However, when scrolling of the map is performed, regardless of a result of selection of icons obtained by the icon display control part 21*b*, the control part 20 invalidates the selection. As a result, the result of selection of icons obtained by the icon display control part 21*b* is not reflected in map display, and accordingly, even if the number of icons is changed, the type of icons is maintained before and after the scrolling.

When the number of icons becomes greater than or equal to the threshold value or becomes less than the threshold value for other reasons than scrolling, the control part 20 allows the selection of the type of icons. For example, in the present embodiment, as described above, by the user providing instructions using the user I/F part 44, the map scale can be changed and the type of facilities to be displayed can be changed. When the map scale is changed, the control part 20 allows a change in the type of icons before and after the change in scale. Namely, when the scale is changed, since the number of icons on one screen can change with the change in scale, the number of icons may become greater than or equal to the threshold value or become less than the threshold value before and after the change in scale. In this case, the control part 20 allows a change in the type of icons, and thus, the type of icons can change with the change in scale.

In such a change in scale, it is less likely that switching from small area display to large area display and switching from large area display to small area display are frequently repeated. In addition, it is assumed that if the type of icons is maintained when the scale is changed, then the area occupied by the icons on the map becomes too large or too small and it becomes hard to see the map or icons. However, in the present embodiment, since a change in the type of icons upon a scale change is allowed, it is possible to prevent a situation in which it becomes hard to see the map or icons.

Furthermore, as described above, the control part 20 selects a type of facilities instructed by the user from among a plurality of types recorded in the map information 30*a*, and determines facilities of the selected type to be facilities to be displayed. The control part 20 allows a change in the type of icons before and after a change in the type of facilities to be displayed. Namely, when the user changes the type of facilities to be displayed, since the number of icons on one screen can change with the change in the type of facilities to be displayed, the number of icons may become greater than or equal to the threshold value or become less than the threshold value before and after the instruction by the user.

In this case, the control part 20 allows the change in the type of icons, and thus, the type of icons can change with the change in the type of facilities to be displayed.

Furthermore, if a change in the type of icons is allowed when the number of icons displayed on the map is changed by scrolling of the map, then the type of icons frequently changes along with the scrolling of the map, by which the user can feel annoyed. However, in the present embodiment, a change in the type of icons before and after scrolling of the map is prohibited. Therefore, even if the number of icons to be displayed is changed with scrolling of the map and the type of icons which is selected based on the number of the icons is changed, the selection is invalidated and thus the type of icons does not change. Hence, according to the present embodiment, comparing with a configuration in which the type of icons can change with scrolling of the map, the frequency of the user feeling annoyed can be reduced.

(2) Icon Display Process

Figure 2:
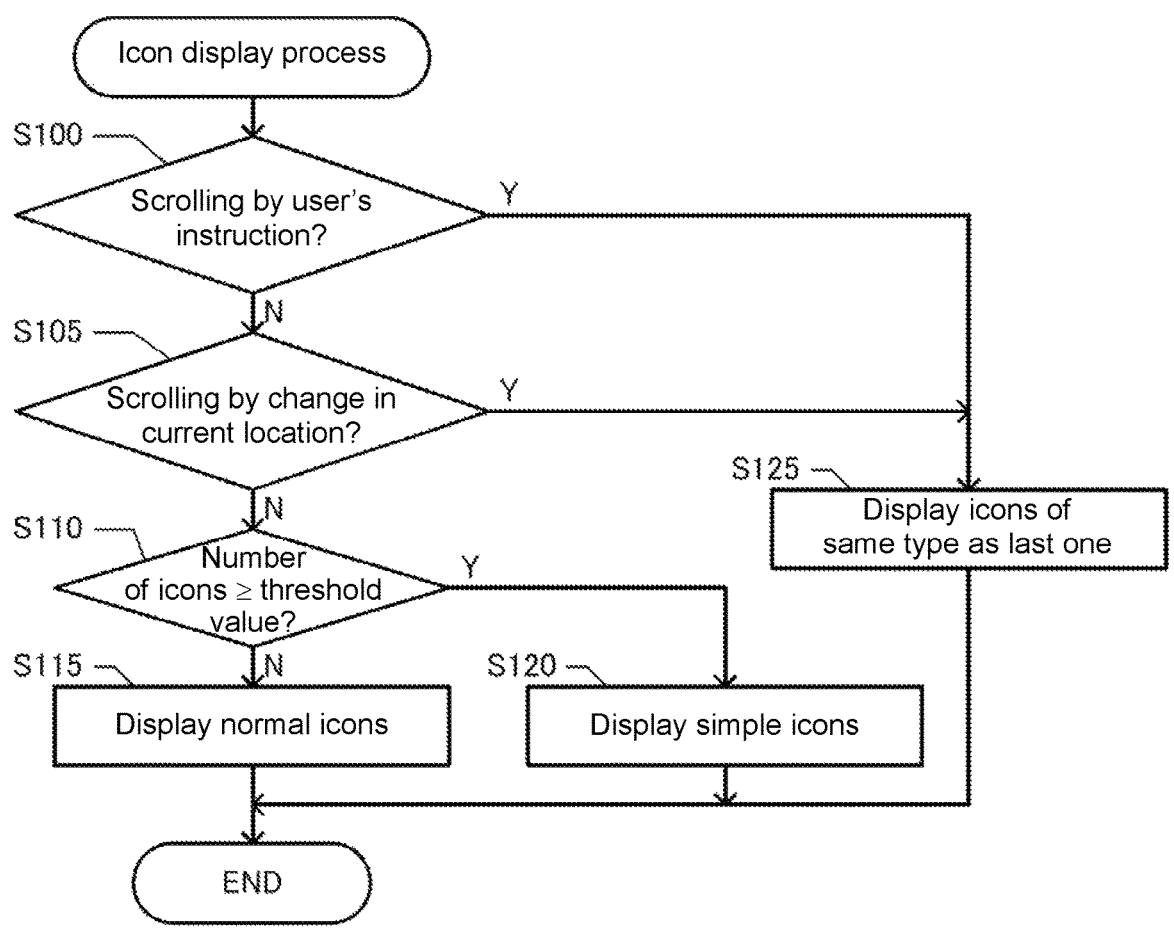
FIG. 2 is a flowchart showing an icon display process.

Next, an icon display process will be described in detail. FIG. 2 is a flowchart of an icon display process. While the control part 20 displays a map on the display of the user I/F part 44 by a process of the display control part 21*d*, the control part 20 performs the icon display process every certain period. In the icon display process, the control part 20 determines whether scrolling by a user's instruction has occurred, by a process of the icon selection control part 21*c* (step S100). Namely, the control part 20 monitors the range of a map rendered by the map display part 21*a*, and records a history indicating at least the ranges of the map obtained immediately before performing the current icon display process and the last icon display process, in a recording medium which is not shown. In addition, the control part 20 records a history of user's operations in the recording medium which is not shown.

Hence, the control part 20 determines, based on the history indicating the ranges of the map, whether the map has been scrolled, and determines, based on the history of user's operations, whether the user has provided a scrolling instruction before the scrolling. Then, when scrolling has been performed and the user has provided a scrolling instruction before the scrolling, the control part 20 determines that scrolling by a user's instruction has occurred.

If it is determined in step S100 that scrolling by an instruction has occurred, the control part 20 displays icons of the same type as the last one, by processes of the icon display control part 21*b* and the icon selection control part 21*c* (step S125). Namely, the control part 20 prohibits a change in the type of icons by a process of the icon selection control part 21*c*. Then, the control part 20 outputs a control signal to the user I/F part 44 to delete the displayed icons, by a process of the icon display control part 21*b*. In addition, since a change in the type of icons is prohibited, the control part 20 identifies a type of icons to be displayed based on information recorded in a RAM or the like which is not shown, by a process of the icon display control part 21*b*. In addition, the control part 20 identifies the locations of facilities included in the range of the map currently displayed, by referring to the map information 30*a*, and outputs a control signal to the user I/F part 44 to display icons of the type to be displayed at the locations of the facilities, by a process of the icon display control part 21*b*. In this case, since the type of icons to be displayed has not been changed from the last icon display process, icons of the same type as the deleted icons are displayed at the locations of the facilities.

If, in step S100, it is not determined that scrolling by a user's instruction has occurred, the control part 20 determines whether scrolling by a change in current location has occurred (step S105). Namely, the control part 20 has a history of current locations recorded in the recording medium which is not shown. Then, the control part 20 determines, based on the history indicating the ranges of the map, whether the map has been scrolled, and determines, based on the history of current locations, whether the current location has been changed with the scrolling. Then, when scrolling has been performed and the current location has been changed before and after the scrolling, the control part 20 determines that scrolling by a change in current location has occurred.

Figure 3A:
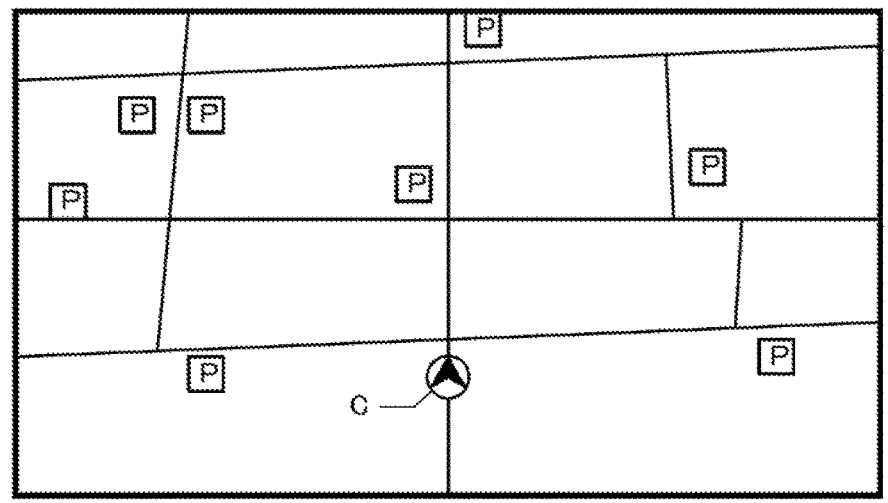
FIGS. 3A, 3B, and 3C are diagrams describing exemplary map display.
Figure 3B:
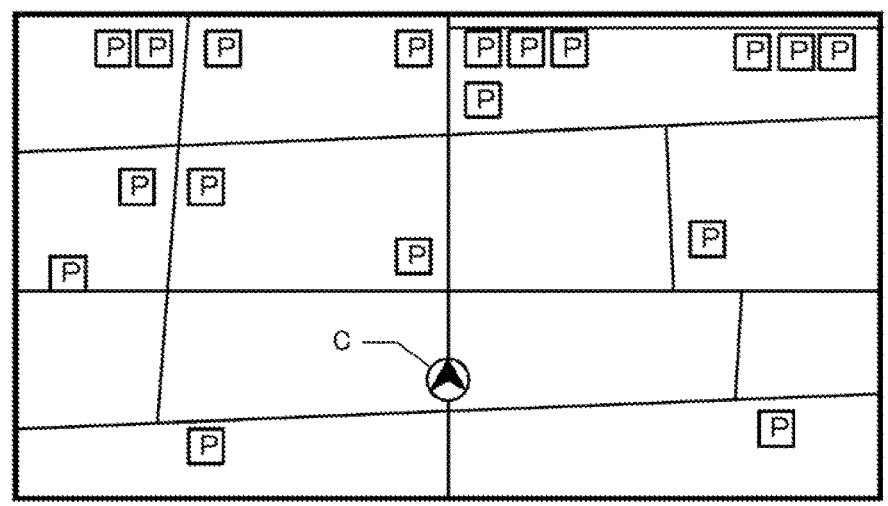
Figure 3C:
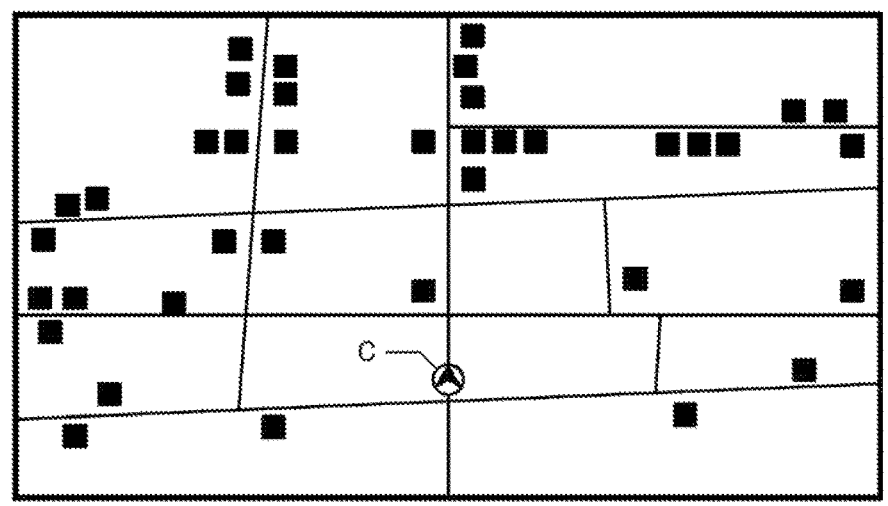

If it is determined in step S105 that scrolling by a change in current location has occurred, in step S125 the control part 20 displays icons of the same type as the last one. FIGS. 3A to 3C are diagrams showing examples of a map displayed on the display. Each diagram shows an example in which an icon representing the vehicle is displayed at a current vehicle location C, and icons representing parking lots are displayed on the map. In this example, an icon having the letter "P" in a white rectangle is a normal icon, and a black rectangle is a simple icon. When the vehicle travels in a traveling direction (upward on the map) with the map shown in FIG. 3A being displayed, the map is scrolled as shown in FIG. 3B.

Here, it is assumed that icons of parking lots displayed in the example shown in FIG. 3B are greater than or equal to the threshold value. Even if the icons of parking lots displayed are thus greater than or equal to the threshold value, in the present embodiment, when scrolling by the map is performed, step S125 is performed via step S100. Therefore, even if the map is scrolled from FIG. 3A to FIG. 3B and the icons of parking lots displayed in FIG. 3B are greater than or equal to the threshold value, the type of icons does not change. In the present embodiment, even if scrolling from FIG. 3A to FIG. 3B has occurred by a user's instruction, the type of icons does not change.

On the other hand, if it is not determined in step S105 that scrolling by a change in current location has occurred, the control part 20 determines whether the number of icons is greater than or equal to the threshold value, by a process of the icon display control part 21b (step S110). Namely, the control part 20 identifies a range of the map currently displayed, and identifies the number of facilities of a type to be displayed that are included in the range of the map, by a process of the map display part 21a. Then, the control part 20 considers the number of facilities as the number of icons displayed on the map, and compares the number of icons with a predetermined threshold value. The threshold value is a value set in advance as a value at which it becomes hard to see a map when normal icons are simultaneously displayed on the map. Note that step S110 is performed when it is not determined in step S105 that scrolling by a change in current location has occurred. Therefore, in the present embodiment, step S110 is performed when an arbitrary event has not occurred and when an event other than scrolling of the map (a change in scale, a change in the type of facilities to be displayed, etc.) has occurred.

If it is not determined in step S110 that the number of icons is greater than or equal to the threshold value, the control part 20 displays normal icons by a process of the icon display control part 21b (step S115). Namely, the control part 20 outputs a control signal to the user I/F part 44 to delete the displayed icons. In addition, the control part 20 identifies the locations of facilities included in the range of the map currently displayed, by referring to the map information 30a, and outputs a control signal to the user I/F part 44 to display normal icons representing the facilities at the locations of the respective facilities. Furthermore, the control part 20 records the normal icons as the type of icons to be displayed in the RAM or the like which is not shown.

If it is determined in step S110 that the number of icons is greater than or equal to the threshold value, the control part 20 displays simple icons by a process of the icon display control part 21b (step S120). Namely, the control part 20 outputs a control signal to the user I/F part 44 to delete the displayed icons. In addition, the control part 20 identifies the locations of facilities included in the range of the map currently displayed, by referring to the map information 30a, and outputs a control signal to the user I/F part 44 to display simple icons representing the facilities at the locations of the respective facilities. Furthermore, the control part 20 records the simple icons as the type of icons to be displayed in the RAM or the like which is not shown.

In the above-described step S115 and S120, the type of icons can change before and after a change in icons. For example, a case is assumed in which, with parking lots being displayed by normal icons like the map shown in FIG. 3A, the user changes the scale to display a larger area, and as a result, the map shown in FIG. 3C is displayed. In this case, when the number of icons after the change in scale is greater than or equal to the threshold value, the control part 20 performs step S120 via step S110. As a result, parking lots are displayed by simple icons as indicated by black rectangles in FIG. 3C.

In the above-described icon display process, in scrolling by a user's instruction or a change in current location, the map display range is often changed in a short period. For example, scrolling by a user's instruction occurs when, for example, the user scrolls the map as intended to search for a facility or the like of his/her interest. It is often the case that, when the user does not know well about the location of a facility or the like of his/her interest, scrolling is performed a plurality of times to search for the facility or the like. In addition, when the vehicle is traveling, scrolling by a change in current location frequently occurs. Therefore, according to the present embodiment in which the type of icons does not change even if scrolling of the map by a user's instruction or a change in current location occurs, the type of icons is not frequently switched by scrolling that can frequently occur, enabling to reduce the frequency of the user feeling annoyed.

Note that here an example is shown in which a change in the type of icons in association with scrolling by a user's instruction and scrolling by a change in current location is prohibited, and thus, in the case of scrolling by other reasons (e.g., automatic scrolling along a planned travel route), a change in the type of icons may be allowed. According to this configuration, a change in the type of icons is prohibited for a case in which scrolling is often repeated at short intervals like a user's instruction and a change in current location, and a change in the type of icons in association with scrolling by other reasons can be allowed. Needless to say, it is possible to adopt a configuration in which a change in the type of icons in association with all scrolling is prohibited. According to this configuration, there is no need to identify a reason for scrolling, simplifying the configuration.

(3) Other Embodiments

The above-described embodiment is an example for implementing aspects of the present application, and various other embodiments can also be adopted as long as a change in the type of icons before and after scrolling is prohibited. For example, a mobile unit that moves with the navigation system 10 is any, and may be a vehicle and may be a pedestrian, and various examples are assumed. In addition, a retrieval system may be an apparatus mounted on a vehicle, etc., or may be an apparatus implemented by a portable terminal, or may be a system implemented by a plurality of apparatuses (e.g., a client and a server).

Furthermore, at least one of the map display part 21*a*, the icon display control part 21*b*, and the icon selection control part 21*c* that form the retrieval system may be divided into a plurality of apparatuses and present. Needless to say, a part of the configuration of the above-described embodiment may be omitted or the sequence of processes may be changed or omitted.

The map display part only needs to be able to display a map on the display. Namely, the map display part only needs to be able to display a map serving as a target for being superimposed with icons representing ground objects, on the display. The icon display control part only needs to be able to select a type of icons to be displayed from among a plurality of types, and display ground objects by icons of the selected type on the map. The icons may be any as long as they represent ground objects. For example, a configuration can be adopted in which ground objects of the same type or ground objects of the same attribute are represented by identical icons (a configuration in which parking lots are displayed by identical icons, a configuration in which convenience stores of the same chain are displayed by identical icons, etc.).

A type of icons to be displayed only needs to be selected based on a predetermined rule, and various rules can be adopted. For example, icons may be selected based on, as described above, the number of icons displayed in a region where the current location is present or on one screen, or icons may be selected based on the map scale, the distance between icons, etc. Ground objects to be displayed may be determined by various techniques, e.g., a user's instruction, a destination, a planned travel route, or the known levels of ground objects.

For the types of icons, various types that can differ in the way of displaying on the map can be assumed. For example, two types of icons by simple display and by detailed display can be assumed. In addition, for example, two types of icons that change based on the map scale, the number of icons on one screen, etc., may be set, or three or more types of icons may be set for ground objects of the same type. It is preferred that at least a display mode changes between different types of icons. Therefore, a configuration is assumed in which at least one of the shape, color, size, etc., of an icon changes between different types of icons.

The icon selection control part only needs to be able to allow or prohibit a change in the type of icons. In addition, when scrolling of the map is performed, the icon selection control part prohibits a change in the type of icons before and after the scrolling. Namely, when scrolling of the map is performed, a reason for selection of icons by the icon display control part can change, but when scrolling of the map is performed, regardless of a result of selection of icons obtained by the icon display control part, the icon selection control part invalidates the selection. Therefore, when a change in the type of icons is prohibited by the icon selection control part, a result of selection of icons obtained by the icon display control part is not reflected in map display. Needless to say, when a change in the type of icons is prohibited, an icon selection process by the icon display control part itself may not be performed. Note that for a configuration for determining whether scrolling has occurred, various configurations can be adopted in addition to a configuration in which, as described above, the determination is performed based on a history indicating the ranges of the map and a history of user's operations. For example, a configuration may be adopted in which it is determined that scrolling has occurred when the range of the map is changed at the same scale.

Furthermore, the prohibition and allowance of a change in the type of icons may be implemented in various modes. For example, in the above-described embodiment, when it is determined in step S100 and S105 shown in FIG. 2 that scrolling has been performed, in step S125 icons of the same type as the last one are displayed, by which a change in the type of icons is prohibited. Namely, a determination as to whether scrolling has been performed is performed before a determination as to whether the number of icons is greater than or equal to the threshold value. However, the sequence of the two determinations may differ from that described above. For example, a configuration may be such that, even if a determination as to whether the number of icons is greater than or equal to the threshold value is performed and selection to change the type of icons is performed based on the determination, when scrolling has been performed, the selection is invalidated, by which a change in the type of icons is prohibited.

Note that various techniques can be adopted for selecting a type of icons to be displayed based on the number of the icons displayed on the map and, for example, a configuration can be adopted in which different types of icons are selected for when the number of icons displayed on the map is greater than or equal to the threshold value and for when the number of icons displayed on the map is less than the threshold value. In addition, when a plurality of types of facilities are displayed on the map, the number of icons may be measured without distinguishing between the different types of facilities, or may be measured on a per type of facilities basis.

Furthermore, a configuration may be such that scrolling is a process performed by at least one of a user's instruction and a change in current location. Namely, in a map display system that displays a map, it is often the case that the range of the map displayed on the display can be changed. Of factors that thus change the range of the map, a change in the range of the map by a user's instruction or by a change in current location can frequently occur in an operational process of the map display system. Therefore, according to a configuration in which the type of icons does not change even if scrolling of the map by at least one of a user's instruction and a change in current location occurs, the type of icons is not frequently switched by scrolling that can frequently occur, enabling to reduce the frequency of the user feeling annoyed.

Furthermore, a configuration may be such that the map display part can display maps of different scales, and when the scale is changed, the icon selection control part allows a change in the type of icons. Namely, when the scale is changed, a different icon may be selected along with the change in scale (e.g., a change in the number of icons on one screen). In general, it is less likely that, upon a scale change, switching from small area display to large area display and switching from large area display to small area display are frequently repeated. In addition, it is assumed that if the type of icons is maintained when the scale is changed, then the area occupied by the icons on the map becomes too large or too small and it becomes hard to see the map or icons. Hence, according to a configuration in which the icon selection control part allows a change in the type of icons when the scale is changed, it is possible to prevent a situation in which it becomes hard to see the map or icons.

Furthermore, the icon display control part may select a type of ground objects to be displayed from among a plurality of types and may be able to display ground objects of the selected type on the map. According to this configuration, icons are selected from a plurality of types on a per type of ground objects basis. In this configuration, the icon selection control part may be configured to allow a change in the type of icons when the type of ground objects to be displayed on the map is changed. Namely, a configuration may be such that, when the type of ground objects to be displayed is changed, it is considered that the type of icons can change as a matter of course, and thus, a change in the type of icons is allowed.

Furthermore, a technique for prohibiting a change in the type of icons before and after scrolling is also applicable as a program or a method. In addition, it can be assumed that a system, a method, and a program such as those described above are implemented as a single apparatus or implemented by a plurality of apparatuses, and thus include various modes. For example, it is possible to provide a navigation system, method, and program including means such as those described above. In addition, changes can be made as appropriate, e.g., a part is software and a part is hardware. Furthermore, the features described above may be embodied as a recording medium for a program that controls the system. Needless to say, the recording medium for software may be a magnetic recording medium or a magneto-optical recording medium, or even any recording medium to be developed in the future can also be considered exactly in the same manner.

REFERENCE SIGNS LIST

10: Navigation system, 20: Control part, 21: Map display program, 21a: Map display part, 21b: Icon display control part, 21c: Icon selection control part, 21d: Display control part, 30: Recording medium, 30a: Map information, 41: GPS receiving part, 42: Vehicle speed sensor, 43: Gyro sensor, and 44: User I/F part

The invention claimed is:

1. A map display system comprising:
at least one processor configured to implement:
   a map display part that displays a map on a display; and
   an icon display control part that selects a type of icons to be displayed from among a plurality of types based on a number of the icons displayed on the map, and displays ground objects by the icons of the selected type on the map; and
   an icon selection control part that allows or prohibits a change in the type of icons selected by the icon display control part, and prohibits, when scrolling of the map is performed, a change in the type of icons before and after the scrolling.

2. The map display system according to claim 1, wherein the icon display control part selects normal icons as the type of icons when the number of the icons displayed on the map is less than a threshold value, and selects simple icons as the type of icons when the number of the icons displayed on the map is greater than or equal to the threshold value.

3. The map display system according to claim 1, wherein the scrolling is performed by at least one of a user's instruction and a change in current location.

4. The map display system according to claim 1, wherein
the map display part can display maps of different scales, and
the icon selection control part allows a change in the type of icons when a scale is changed.

5. The map display system according to claim 1, wherein
the icon display control part selects a type of the ground objects to be displayed from among a plurality of types, and can display the ground objects of the selected type on the map, and
the icon selection control part allows a change in the type of icons when the type of the ground objects displayed on the map is changed.

6. A map display system that displays a plurality of types of icons representing ground objects on a map, comprising
at least one processor configured to implement:
   a map display part that displays a map on a display;
   an icon display control part that selects a type of icons to be displayed on the map, wherein the icon display control part is further configured to:
      when a scale of the map is changed, a type of the icons is changed based on a number of the icons displayed on the map, and
      when scrolling of the map is performed, the type of the icons is maintained regardless of the number of the icons displayed on a screen.

7. A non-statutory computer-readable medium storing a map display program causing a computer to function as:
   a map display part that displays a map on a display;
   an icon display control part that selects a type of icons to be displayed from among a plurality of types based on a number of the icons displayed on the map, and displays ground objects by the icons of the selected type on the map; and
   an icon selection control part that allows or prohibits a change in the type of icons selected by the icon display control part, and prohibits, when scrolling of the map is performed, a change in the type of icons before and after the scrolling.

* * * * *